United States Patent [19]

Delassus

[11] 4,321,958
[45] Mar. 30, 1982

[54] ELECTROMAGNETIC INDUCTOR FOR GENERATING A HELICAL FIELD

[75] Inventor: Jean Delassus, Montmorency, France

[73] Assignee: Cem Compagnie Electro-Mecanique, Paris, France

[21] Appl. No.: 112,701

[22] Filed: Jan. 16, 1980

[30] Foreign Application Priority Data

Jan. 30, 1979 [FR] France ............... 79 02274

[51] Int. Cl.³ .................................. B22D 27/02
[52] U.S. Cl. .............................. 164/468; 164/504
[58] Field of Search ............. 361/143; 164/468, 504; 366/273, 274; 425/174.8 R, 174.8 E; 336/135

[56] References Cited

U.S. PATENT DOCUMENTS

| | | | |
|---|---|---|---|
| 3,693,697 | 9/1972 | Tzavaras | 164/468 |
| 3,882,923 | 5/1975 | Alberny et al. | 164/468 X |
| 4,200,137 | 4/1980 | Zavaras et al. | 164/468 |

*Primary Examiner*—Reinhard J. Eisenzopf
*Attorney, Agent, or Firm*—Burns, Doane, Swecker & Mathis

[57] ABSTRACT

An electromagnetic inductor for generating a helically moving magnetic field includes a first magnetic circuit having an annular core with radially inwardly projecting teeth and a winding for generating a rotating magnetic field, and a second magnetic circuit formed by foliated bars and a second winding comprising an axial series of circular coils for generating an axially moving field. The two fields combine to generate a field with helical movement. At least some consecutive teeth of the core are hollowed to provide axial grooves in which the foliated bars are disposed. The coils of the second winding are cylindrical and set inside the cylindrical volume defined by the teeth. The inductor is particularly adapted for the electromagnetic rabbling of a billet in a continuous casting process.

7 Claims, 6 Drawing Figures

ELECTROMAGNETIC INDUCTOR FOR GENERATING A HELICAL FIELD

BACKGROUND OF THE INVENTION

The present invention relates to an electromagnetic inductor for generating a magnetic field with helical movement in a cylindrical volume through the superposition of a rotating magnetic flux and an axially moving magnetic flux. Such an inductor includes a first magnetic circuit comprising a core made from a stack of thin magnetic crowns, insulated one from the others, tightly held between ring-shaped end plates, and cut out on the internal side to form wide, regularly spaced teeth in the circumferential direction divided by notches, and a first polyphase induction winding having coils which are disposed in the notches to generate the rotating flux. A second magnetic circuit includes bars parallel to the axis and foliated in generally diametrical planes, and a second polyphase induction winding made up of circular coils, axially spaced and coaxial to the first magnetic circuit, in which the phases of the windings axially follow one another to generate the axially moving flux.

The utilization of a magnetic field with helical movement for the rabbling of billets in a continuous casting installation is the subject of commonly assigned U.S. patent application Ser. No. 38,428 filed May 14, 1979, now abandoned. Two possible embodiments of inductors are described in that application. A first set of coils set up in the notches of the first magnetic circuit of the inductor creates a rotating field, and a second set of circular, axially and regularly spaced coils creates an axially moving field. Yokes made up of bars, parallel to the axis and regularly spaced in the circumferential sense, permit closing of the loop of flux generated by the second set of coils.

In the two types of inductors described in the previously mentioned application, the mounting of the windings and of the elements of the magnetic circuits is difficult because the coils and the other elements of the magnetic circuits are imbricated one in the others. Furthermore, an additional problem arises in inductors where there is a coexistence of polyphase polar coils set up on the periphery of a magnetic circuit for creating a rotating magnetic field and coaxial circular coils surrounded by magnetic yokes in the shape of straight bars set up around these circular coils. Such an inductor must be designed so that the combination of fluxes generated by the two systems permits each one of the flux paths to close without a mutual reaction between the coils of one system and the yokes of the other system, in order to avoid parasitic electrical losses and to obtain the impedance of the adjustments of the two modes of action on the secondary load, due to a perfect decoupling of the magnetic circuits.

OBJECT AND BRIEF SUMMARY OF THE INVENTION

It is therefore an object of the present invention to provide an electromagnetic rabbling inductor whose various elements may be mounted easily and in an exact manner, and which will alleviate the above mentioned problems by using a doubly foliated magnetic circuit for guiding the fluxes without reciprocal interlooping of the coils of one circuit by the flux of the other circuit.

These, as well as other objects and advantages of the present invention, are achieved by providing an inductor in which at least some consecutive teeth of the first magnetic circuit are partially hollowed to form axial grooves, the bars of the second magnetic circuit are set into these grooves and separated from the first magnetic circuit by insulation, and the coils generating the axially moving flux are cylindrical and set up inside the cylindrical volume defined by the teeth of the first magnetic circuit.

The foliated bars forming the second magnetic circuit are conveniently made up of thin metal sheets, glued together and mechanically locked by means of notches provided on the end-plates.

BRIEF DESCRIPTION OF THE DRAWINGS

The present invention will be best understood with the help of the accompanying drawings which particularly relate to an inductor for the electromagnetic rabbling of billets in continuous casting, wherein.

DETAILED DESCRIPTION

Figure 1:
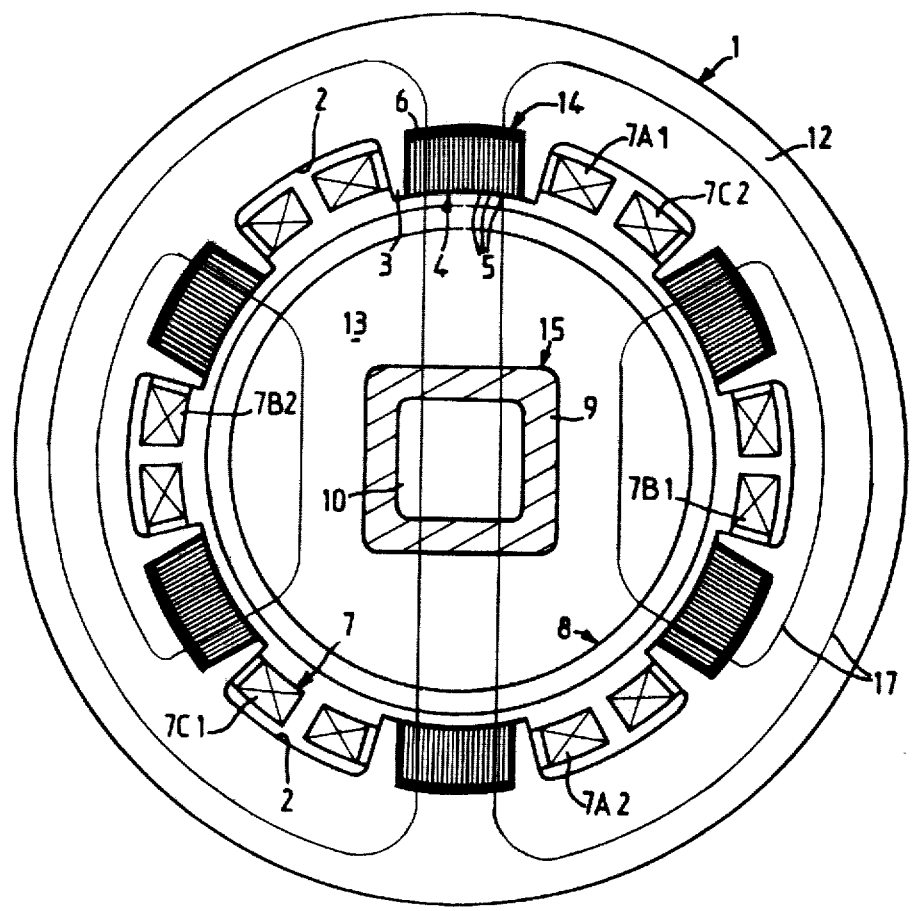
FIG. 1 is a cross sectional view of an inductor constructed according to the present invention including a magnetic circuit with six teeth and six notches.

Referring to all of the Figures in general, a first magnetic circuit 1 channels the rotating magnetic flux generated by a first polyphase induction winding 7. The core of the first magnetic circuit 1 is made by stacking thin magnetic crowns 12, insulated one from the others, preferably glued together, and cut out so as to form notches 2 and teeth 3. As described in French Pat. No. 2,335,392, in order to obtain a flux which diametrically crosses the internal cylindrical volume 13, where the cooling billet 15 is located, it is convenient that the first polyphase induction winding 7 be made up of an even number of polar coils, each surrounding one tooth 3, and that the polar coils located around two diametrically opposite teeth be associated with the same phase and be coupled in such a way that the generated flux be additive. The billet 15 is illustrated during a cooling off period wherein electromagnetic rabbling is realized by means of the inductor.

Figure 2:
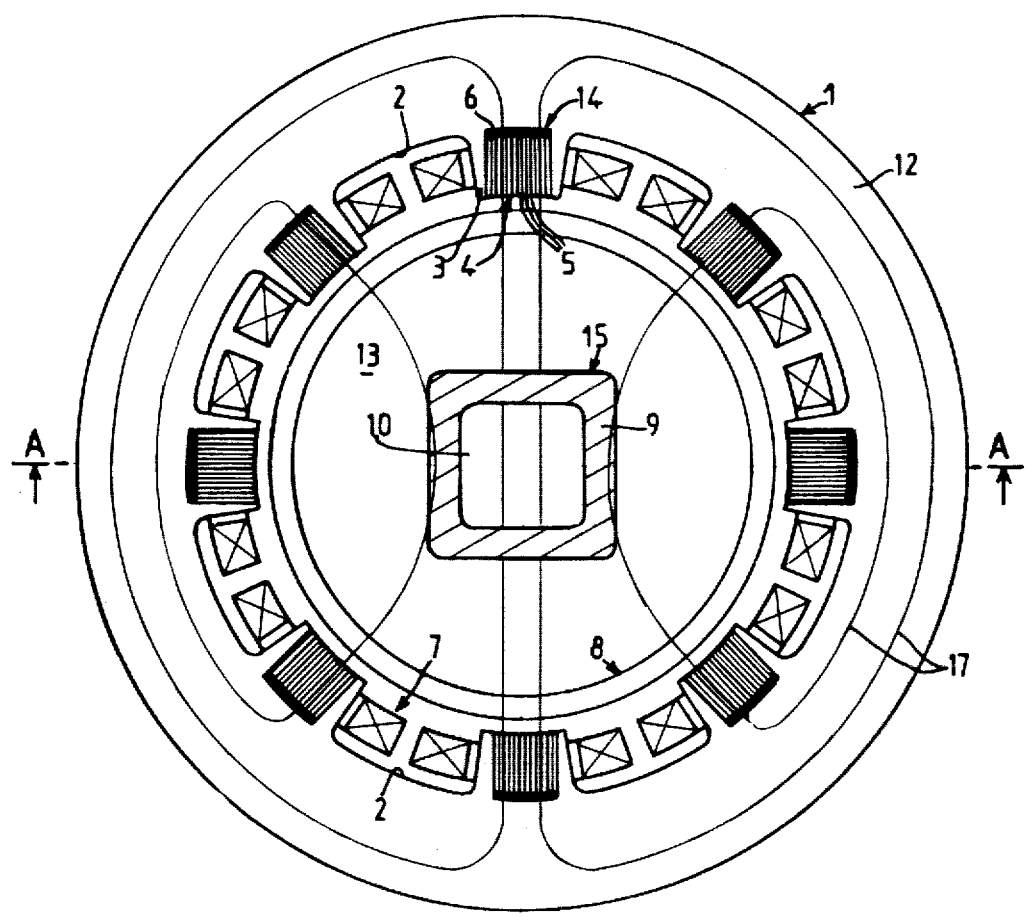
FIG. 2 is a cross sectional view of an inductor constructed according to the present invention including eight teeth and eight notches.

Referring now to FIGS. 1 and 2, each tooth 3 has a deep groove 14 into which is set one of the bars 4 of a second magnetic circuit used as a return for the axially moving flux generated by a second polyphase induction winding 8 made up of an axial series of cylindrical coils. The bars 4 are made up of thin metal sheets 5 and are foliated in generally diametrical planes so as to pass the loop shaped axially moving flux generated by the second winding 8 whose successive cylindrical coils are connected, respectively, to the successive phases of a polyphase power source (not shown).

The thin magnetic metal sheets 5 of the bars 4 are preferably insulated one from the others and glued together, and the bars 4 are insulated in relation to the bottom and the sides of the grooves 14 by means of insulating sheets 6.

Figure 4:
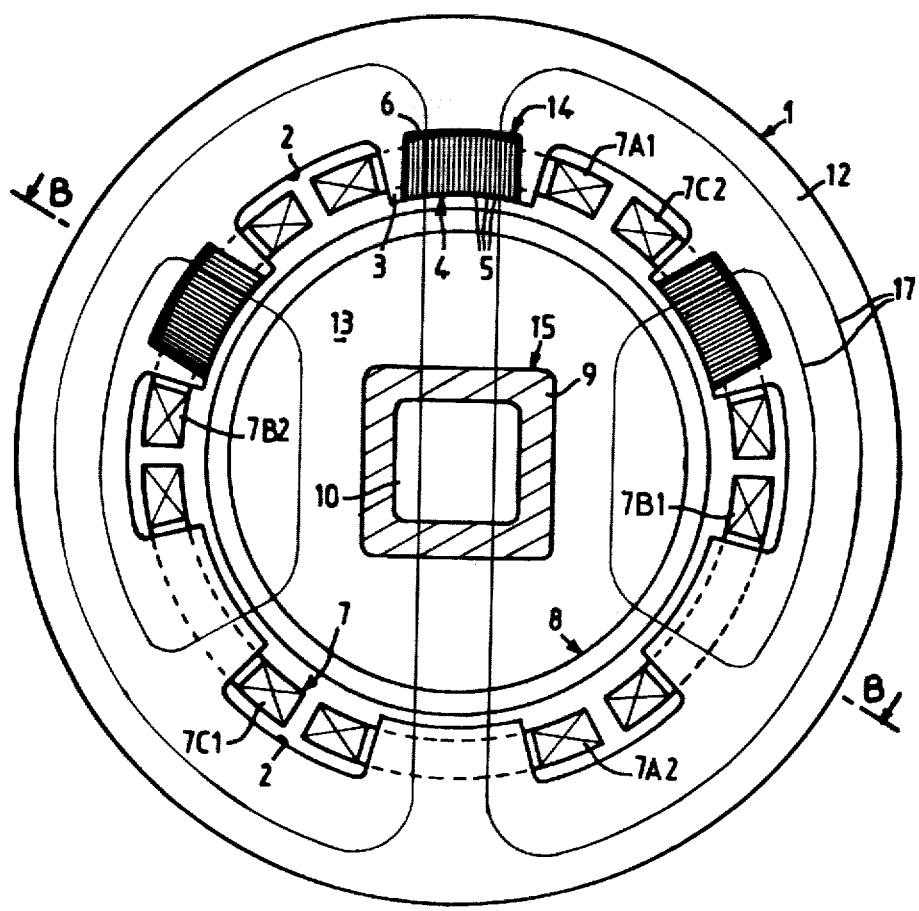
FIG. 4 is a view similar to the one shown on FIG. 1, with foliated bars set up in only three consecutive teeth.
Figure 5:
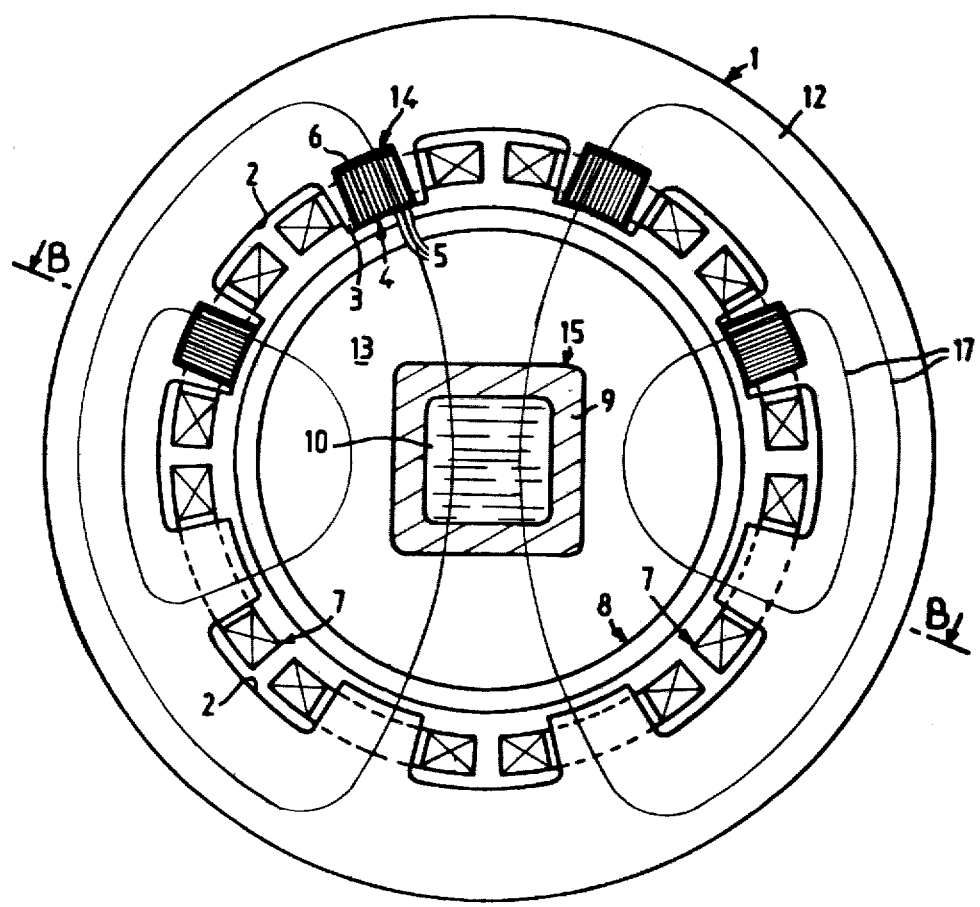
FIG. 5 is a view similar to the one shown on FIG. 2, with foliated bars set up in only four consecutive teeth.

In the modification shown in FIGS. 4 and 5, only three successive teeth 3 (FIG. 4), or four successive teeth 3 (FIG. 5) have a groove 14 in which a foliated bar 4 is located. The other teeth are without such a groove and without a foliated bar.

Annular end-plates 11 (FIGS. 3 and 6) enable the stack of magnetic crowns 12 of the magnetic circuit 1 to be axially tightened. In addition, they maintain the positions of the extremities of the bars 4 due to notches working together with heels 16 provided on the extremities of the bars 4.

Figure 3:
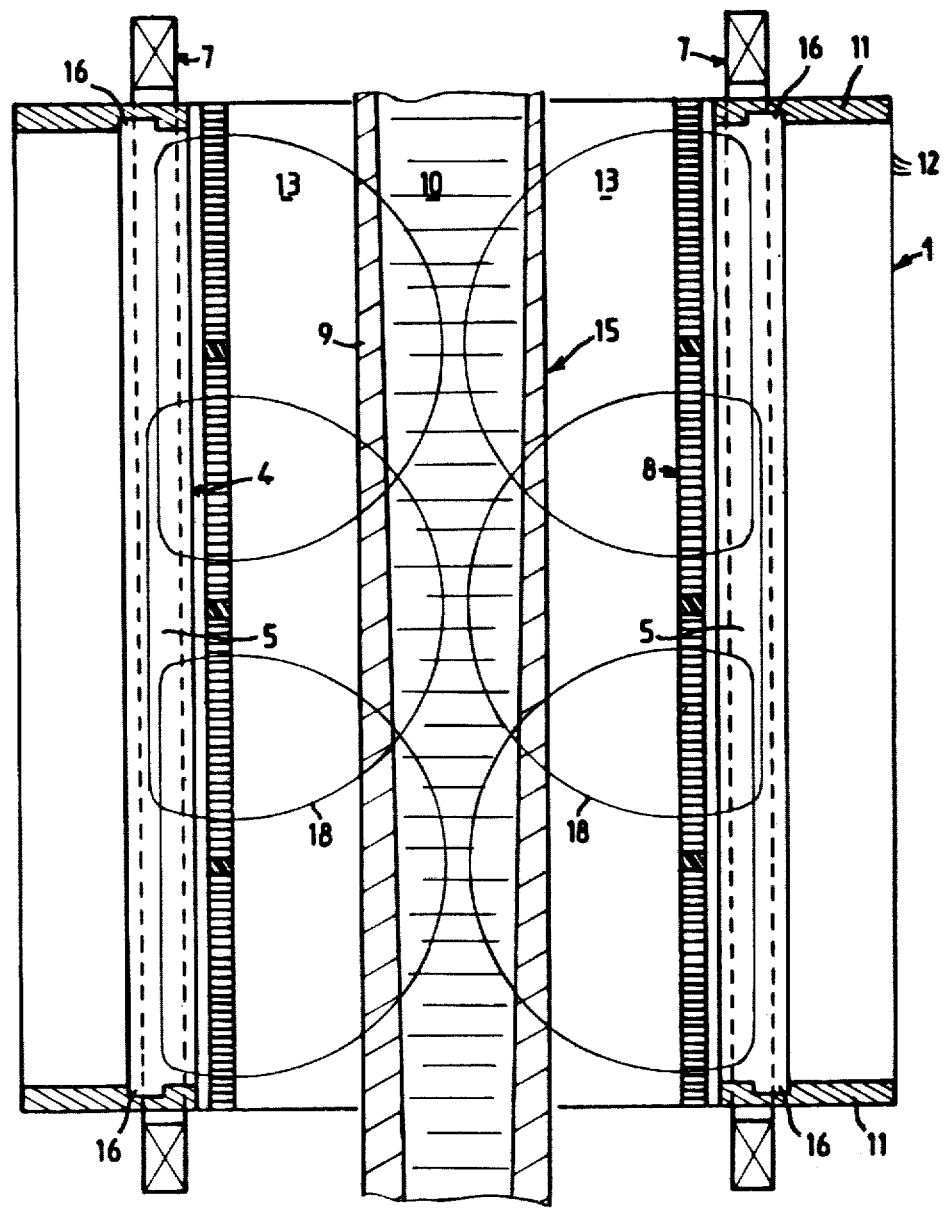
FIG. 3 is a cross sectional axial view taken along the line AA of FIG. 2.
Figure 6:
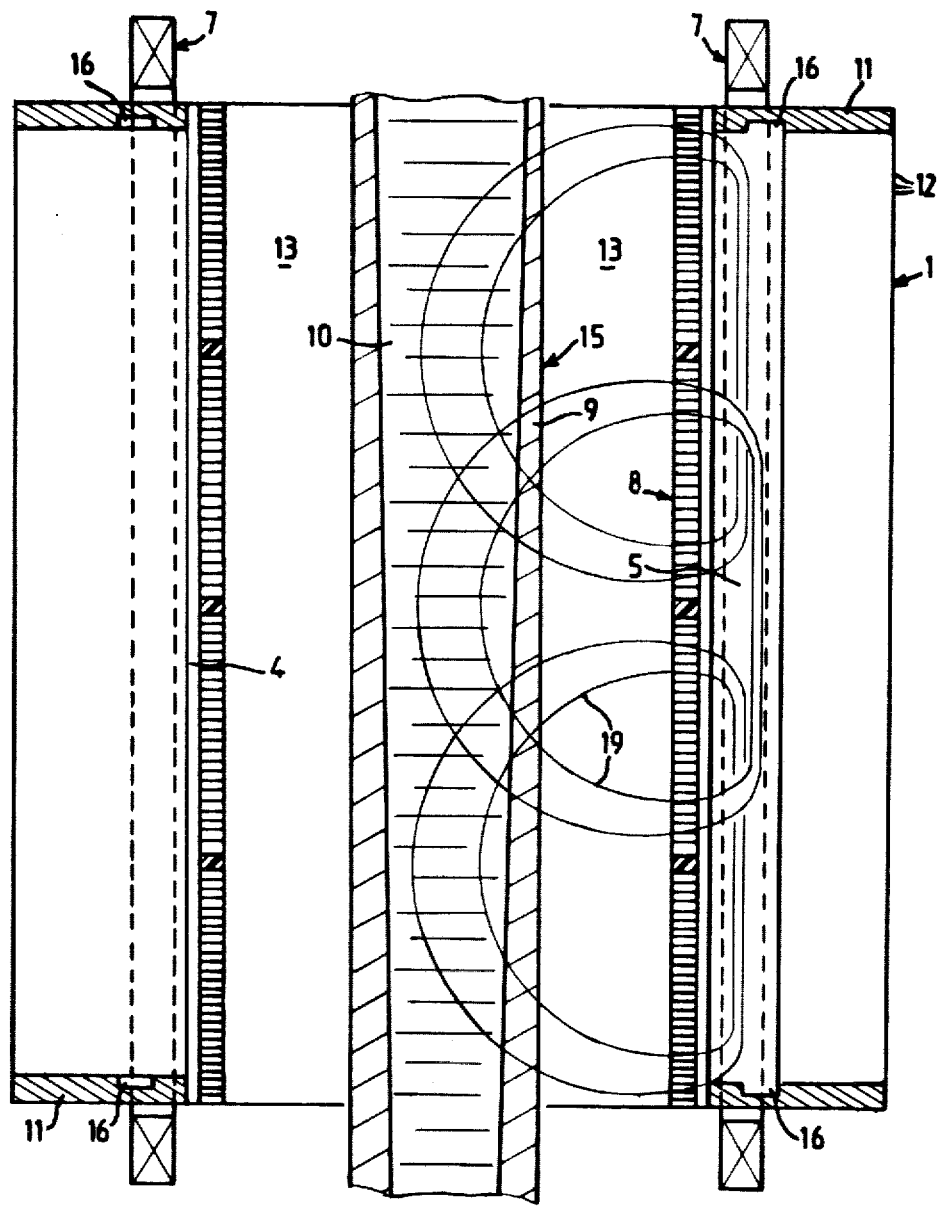
FIG. 6 is a cross sectional axial view taken along the line BB of FIGS. 4 or 5.

The configuration of the magnetic fields is schematically illustrated by flux loops in the various figures. The flux lines 17 illustrate the loops of the field rotating in planes perpendicular to the axis of the billet 15. Flux lines 18 and 19 illustrate the loops of the field moving axially in vertical planes going through the axis of the billet 15. Flux lines 18 correspond to an inductor in which all of the teeth 3 are provided with bars 4 (FIGS. 1 through 3). Flux lines 19 correspond to an inductor in which half of the teeth 3 are provided with bars 4 (FIGS. 4 through 6).

In the operation of the inductor, when the polar coils of the induction winding 7 are excited by polyphase currents, the flux of the rotating field emerges radially through the foliated teeth, passing easily through the horizontal layers of the magnetic circuit 1 to the vertical layers of the bars 4. The flux of the rotating field diametrically crosses inside the cylindrical volume 13 if the diametrically opposite polar coils are coupled with additive flux, and it easily crosses the cylindrical coils of the induction winding 8, whose turns form a magnetically pervious horizontal layer, to stir by rotation the liquid core 10 of the billet 15 during a continuous casting process.

The damping of the rotating field, while going through the cylindrical coils, may be reduced considerably by forming the conducting wire for the cylindrical coils from a thin flat wire coiled from one edge so as to form a helical winding.

When the induction winding 8, which includes several phases, is excited by polyphase currents, its flux forms vertical loops which drain the interior space and tend to close outside the winding 8 by the bars 4 which act as magnetic shunts and collect the external flux, preventing it from inducing circular currents in the magnetic crowns 12 of the magnetic circuit 1. Therefore, the flux loops of the induction winding 8 do not interloop with the polar coils of the induction winding 7, and generate with them a magnetic coupling.

In addition, the flux loops of the induction winding 8 generate an axial motive effort on the external liquid layers of the core 10 of the billet 15 during continuous casting, which creates, within the liquid metal, a movement of vertical convection. In the embodiments shown in FIGS. 1 through 3, the vertical convection movement takes place in the center along the axis of the billet 15. In the embodiments shown in FIGS. 4, 5, and 6, the vertical convection movement created by the induction winding 8 in the liquid metal is due to an axially moving field much more intense on the half circumference provided with the bars 4 than on the opposite half circumference without bars 4, while the return current takes place vertically on the side of the other half circumference where the axially moving field is weaker because it cannot close due to the absence of bars.

When the two fields are simultaneously applied, a superposition of the preceding effects takes place in the billet 15. That is, a helical convection movement is created, while in the inductor each flux flows in its respective magnetic circuit with a good yield.

FIGS. 1 and 4 illustrate the embodiment wherein the induction winding 7, for generating the rotating flux, includes six polar coils mounted on six teeth 3, respectively. The coils 7A1 and 7A2, 7B1 and 7B2, 7C1 and 7C2 are electrically connected, in pair, to the phases U, V and W, respectively, of a source of three-phase alternating current (not shown) and are coupled two by two in such a manner that the flux generated on two diametrically opposite teeth bearing coils belonging to the same phase are added.

The induction winding 8 for generating the axially moving flux may be fed three-phase, two-phase or polyphase alternating current. It is also possible to feed different frequency signals, respectively, to the induction winding 7 for generating the rotating flux and to the induction winding 8 for generating the axially moving flux.

FIGS. 2 and 5 correspond to a magnetic circuit 1 whose induction winding 7 includes eight polar coils fed with tetraphase alternating current. The previously mentioned observations are applicable with respect to the phase and the coupling of the coils set around two diametrically opposite teeth, as well as with respect to the number of phases of the alternating current fed to the coils for generating the axially moving flux and the respective frequencies being fed to the two windings 7 and 8.

An inductor constructed according to the present invention may be disposed, in a known manner, in a mold for rabbling in the solidification region of the shell of a billet, and it may be cooled by means of a strong flow of water. It may also be located below the mold, in the region of secondary cooling, outside a toroidal envelope which is also crossed by a strong flow of water and whose side facing the billet is made up, in a known manner, of non-magnetic metal.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. An electromagnetic inductor for generating a helically moving magnetic field in a cylindrical volume through the superposition of a rotating flux and an axially moving flux, comprising:
   a first magnetic circuit for generating a rotating magnetic flux including:
      an annular core having a plurality of circumferentially spaced teeth on the internal surface thereof, wherein at least two adjacent teeth are partially hollowed to provide axial grooves,
      a first polyphase induction winding having coils disposed in the spaces between said teeth;
   a second magnetic circuit for generating an axially moving magnetic flux including:
      a plurality of bars respectively disposed in the axial grooves provided by said hollowed teeth parallel to the axis of rotation of the rotating magnetic flux and insulated from said teeth, a second polyphase induction winding having a plurality of cylindrical, axially spaced coils coaxial with said first magnetic circuit and disposed within the cylindrical volume defined by said teeth.

2. The electromagnetic inductor of claim 1 wherein said core comprises a stack of thin magnetic crowns insulated from one another and tightly held between annular end plates.

3. The electromagnetic inductor of claim 2 further including notches provided in said end plates for mechanically locking said bars in position.

4. The electromagnetic inductor of claim 1, wherein each of the cylindrical coils for generating the axially moving flux is made up of a layer of flat wire coiled from one edge so as to form a helical coil.

5. The electromagnetic inductor of claim 1, wherein all of the teeth of said first magnetic circuit are provided with grooves in which the bars of said second magnetic circuit are respectively disposed.

6. The electromagnetic inductor of claim 1, wherein the first polyphase induction winding comprises an even number of polar coils each one respectively surrounding one of the teeth of the first magnetic circuit, and the polar coils mounted on two diametrically opposite teeth of the first magnetic circuit are electrically coupled, so that the fluxes they generate are additive.

7. The electromagnetic inductor of claim 1 wherein the bars of said second magnetic circuit are foliated in substantially diametrical planes.

* * * * *